United States Patent
Murakawa

(10) Patent No.: US 8,213,445 B2
(45) Date of Patent: Jul. 3, 2012

(54) COMMUNICATION DEVICE AND METHOD FOR CONTROLLING THE OUTPUT OF PACKETS

(75) Inventor: Hiroshi Murakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 508 days.

(21) Appl. No.: 12/045,790

(22) Filed: Mar. 11, 2008

(65) Prior Publication Data
US 2008/0232377 A1 Sep. 25, 2008

(30) Foreign Application Priority Data
Mar. 19, 2007 (JP) .................... 2007-71653

(51) Int. Cl.
 H04L 12/26 (2006.01)
 H04L 12/28 (2006.01)
 H04L 12/56 (2006.01)
(52) U.S. Cl. ........ 370/417; 370/229; 370/230; 370/412; 370/413; 370/395.4; 370/395.42
(58) Field of Classification Search ............... 370/230.1, 370/236, 253, 389, 395.1, 395.4, 413, 466; 709/232
See application file for complete search history.

(56) References Cited

U.S. PATENT DOCUMENTS

| | | | | |
|---|---|---|---|---|
| 5,570,362 A * | 10/1996 | Nishimura | ..................... | 370/466 |
| 5,581,544 A * | 12/1996 | Hamada et al. | ................ | 370/253 |
| 5,818,818 A * | 10/1998 | Soumiya et al. | .............. | 370/252 |
| 5,859,980 A * | 1/1999 | Kalkunte | ...................... | 709/232 |
| 6,101,193 A * | 8/2000 | Ohba | ............................. | 370/429 |
| 6,151,299 A * | 11/2000 | Lyon et al. | .................... | 370/229 |
| 6,229,813 B1 * | 5/2001 | Buchko et al. | ................ | 370/412 |
| 6,430,153 B1 * | 8/2002 | Hughes et al. | ............. | 370/230.1 |
| 6,449,255 B1 * | 9/2002 | Waclawsky | ................... | 370/236 |
| 6,532,234 B1 * | 3/2003 | Yoshikawa et al. | ........ | 370/395.4 |
| 6,751,194 B1 * | 6/2004 | Ueno | ............................. | 370/235 |
| 6,754,215 B1 * | 6/2004 | Arikawa et al. | ............. | 370/395.4 |
| 6,798,784 B2 * | 9/2004 | Dove et al. | ..................... | 370/463 |
| 6,816,494 B1 * | 11/2004 | Raza | ........................ | 370/395.41 |
| 6,944,129 B1 * | 9/2005 | Duncan | ......................... | 370/236 |
| 7,016,366 B2 * | 3/2006 | Kawarai et al. | ............... | 370/413 |
| 7,110,359 B1 * | 9/2006 | Acharya | ....................... | 370/235 |
| 7,215,678 B1 * | 5/2007 | Ahlfors et al. | ................ | 370/412 |
| 7,319,860 B2 * | 1/2008 | Robertson et al. | .......... | 455/414.1 |
| 7,706,255 B1 * | 4/2010 | Kondrat et al. | ............... | 370/219 |
| 7,933,283 B1 * | 4/2011 | Liu et al. | ....................... | 370/412 |

(Continued)

FOREIGN PATENT DOCUMENTS

JP  H09-93256 A  4/1997

(Continued)

*Primary Examiner* — Marsha D Banks Harold
*Assistant Examiner* — Christopher Wyllie
(74) *Attorney, Agent, or Firm* — Meyers Wolin, LLC

(57) ABSTRACT

An apparatus including a holding portion temporarily holding packets for each individual quality class; a counter counting the amount of data of packets output from the holding portion for each individual quality class; a comparison portion comparing count values of the counter for individual quality classes with threshold values which are threshold values for the quality classes, respectively, the ratio of the threshold values for the quality classes being coincident with the weighting ratio between the quality classes; an output portion outputting packets held in the holding portion based on results of comparisons made by the comparison portion; and a control portion which, according to the results of the comparisons, subtracts values corresponding to the threshold values for the quality classes from the count values of the counter for the individual quality classes.

9 Claims, 9 Drawing Sheets

U.S. PATENT DOCUMENTS

| | | | |
|---|---|---|---|
| 2001/0007560 A1* | 7/2001 | Masuda et al. | 370/401 |
| 2001/0014081 A1* | 8/2001 | Kawasaki et al. | 370/235 |
| 2001/0033581 A1* | 10/2001 | Kawarai et al. | 370/468 |
| 2002/0114327 A1* | 8/2002 | Mononen | 370/389 |
| 2004/0056783 A1* | 3/2004 | Fallon | 341/51 |
| 2004/0062259 A1* | 4/2004 | Jeffries et al. | 370/412 |
| 2004/0092278 A1* | 5/2004 | Diepstraten et al. | 455/512 |
| 2004/0179092 A1* | 9/2004 | LaPoint | 348/14.08 |
| 2005/0041599 A1* | 2/2005 | Zavalkovsky et al. | 370/252 |
| 2006/0187825 A1* | 8/2006 | Andersen | 370/229 |
| 2007/0008986 A1* | 1/2007 | Xie et al. | 370/412 |
| 2007/0104211 A1* | 5/2007 | Opsasnick | 370/412 |
| 2007/0165647 A1* | 7/2007 | Kenney et al. | 370/395.4 |
| 2007/0230492 A1* | 10/2007 | Ugai et al. | 370/412 |
| 2008/0080382 A1* | 4/2008 | Dahshan et al. | 370/235 |
| 2008/0232377 A1* | 9/2008 | Murakawa | 370/395.41 |

FOREIGN PATENT DOCUMENTS

| | | |
|---|---|---|
| JP | 2002-271385 A | 9/2002 |

* cited by examiner

US 8,213,445 B2

COMMUNICATION DEVICE AND METHOD FOR CONTROLLING THE OUTPUT OF PACKETS

TECHNICAL FIELD

The present invention relates to a communication device for outputting variable-length packets each having an established quality class and also to a method of controlling the output. Particularly, the invention relates to a communication device which, when a quality class is set for each variable-length packet, will implement weighting ratios of output frequencies set for individual quality classes and also to a method of controlling the output.

SUMMARY

According to an aspect of an embodiment, an apparatus includes: a holding portion operable to temporarily hold packets for each individual quality class; a counter operable to count the amount of data of packets output from the holding portion for each individual quality class; a comparison portion operable to compare count values of the counter for individual quality classes with threshold values which are threshold values for the quality classes, respectively, the ratio of the threshold values for the quality classes being coincident with the weighting ratio between the quality classes; an output portion operable to output packets held in the holding portion based on results of comparisons made by the comparison portion; and a control portion which, when the results of the comparisons made by the comparison portion indicate that the count values for all the quality classes are in excess of the respective threshold values, subtracts values corresponding to the threshold values for the quality classes from the count values of the counter for the individual quality classes.

DETAILED DESCRIPTION OF THE EMBODIMENTS

Figure 1:
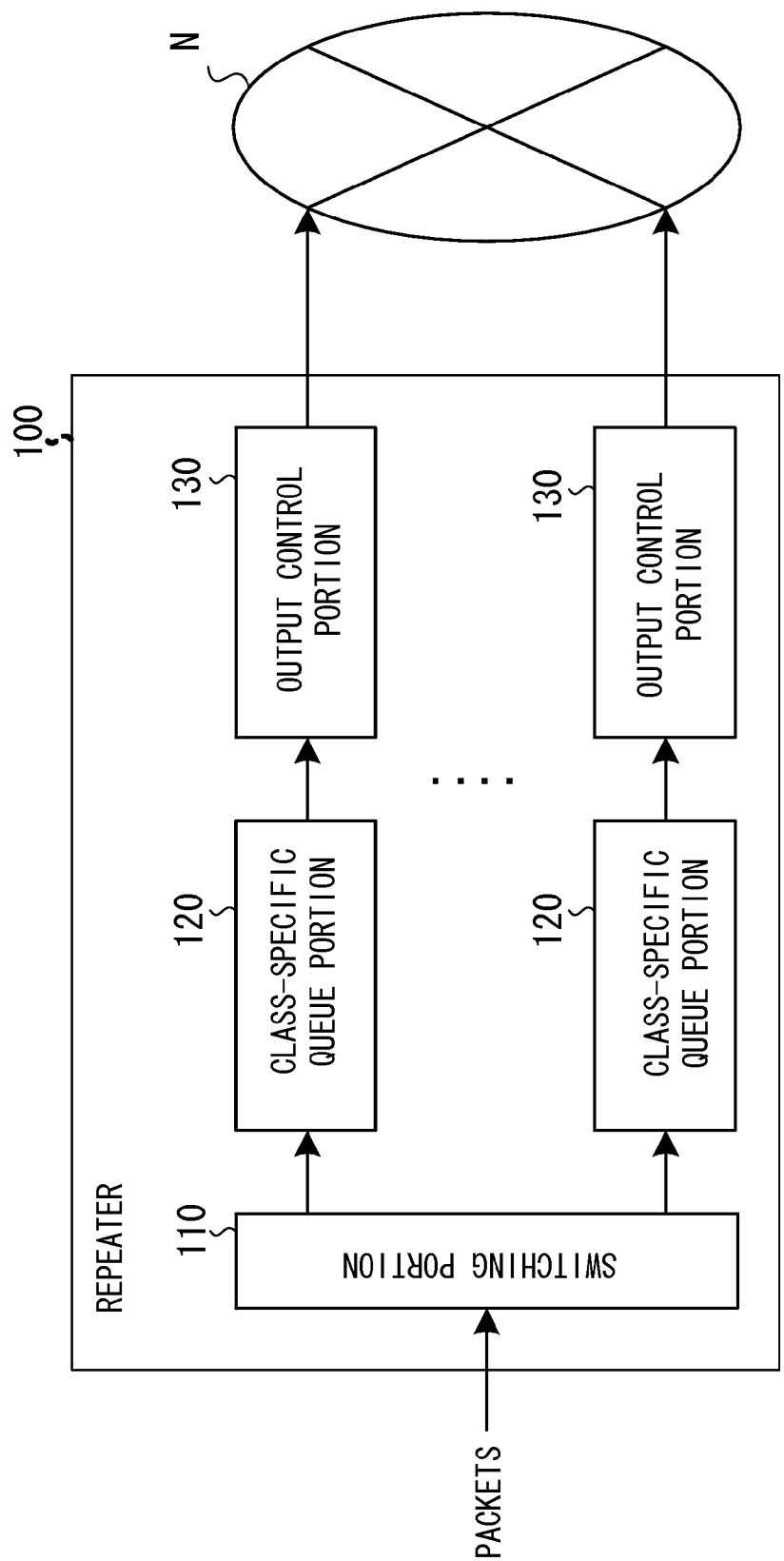
FIG. 1 is a block diagram schematically showing the configuration of a repeater associated with an Embodiment of the present invention.

This disclosure describes the best mode or modes of practicing the invention as presently contemplated. It is important to note that these embodiments are only examples to advise one of ordinary skill in the art of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the various views of the drawings, like reference characters designate like or similar parts.

In a communication system (e.g., ATM (asynchronous transfer mode) where packets (or cells) of fixed lengths are communicated, the classes of the packets may be determined according to the quality imposed on the packets. That is, packets carrying voice data, for example, are required to have a real-time nature. On the other hand, packets carrying non-voice data are not strictly required to have a real-time nature. Therefore, with respect to the quality of packets with a real-time nature, voice data packets are packets of a high class (i.e., having higher priority). Non-voice data packets are packets of a low class (i.e., having lower priority).

In a transmitter for transmitting packets having classes determined as described above, a queue for temporarily storing packets of one class is provided for each class. The frequencies at which packets are output from the queues is made different among the individual queues, thus satisfying the required quality. That is, a counter for counting the number of accumulated packets is provided for each queue. If the count value of the counter exceeds a threshold value set for each queue, packets of fixed lengths are output from the corresponding queue. At the same time, the threshold value is subtracted from the count value. Accordingly, packets are output from higher-class queues at higher frequencies by causing queues for higher-class packets to have smaller threshold values. Thus, it is possible to cater to the required quality of the packets.

Even in communications other than communications where fixed-length packets are communicated such as ATM, quality classes may be set for packets. For example, in Ethernet (trademark registered) networks, packets of variable lengths are exchanged by various applications. Even with respect to transmission of these packets, priority control complying with the required quality may be provided. In particular, queues for different classes are provided in a repeater such as an L2 switch in the same way as ATM treating packets of fixed lengths. The frequencies at which packets are output from the queues are controlled.

At this time, if packets are accumulated in a queue for a high class, a strict priority (SP) system for outputting packets always with priority on queues for high class and a weighted round robin (WRR) system for weighting the frequencies at which packets are output from queues according to classes are used. That is strict priority packets are controlled by strict priority scheduling. On the other hand, with respect to packets of lower classes, the priority is controlled by weighted round robin scheduling.

Strict-priority scheduling is utilized where there are packets that are strongly required to have a real-time nature. Weighted round robin scheduling is utilized where slight propagation delay is tolerated. Each of these scheduling methods may be used alone or in any combination. For example, with respect to classes having more than a certain priority level, strict-priority scheduling is employed. With respect to classes having lower than the certain priority level, weighted round robin (WRR) scheduling is used. Where WRR scheduling is used, packets of variable lengths are output and so it is necessary to provide a counter for counting the flow rate of data output from each queue. The packet output from each queue is controlled such that the count values of the counters that count the flow rate of data become equal to given weighting ratios.

Figure 8:
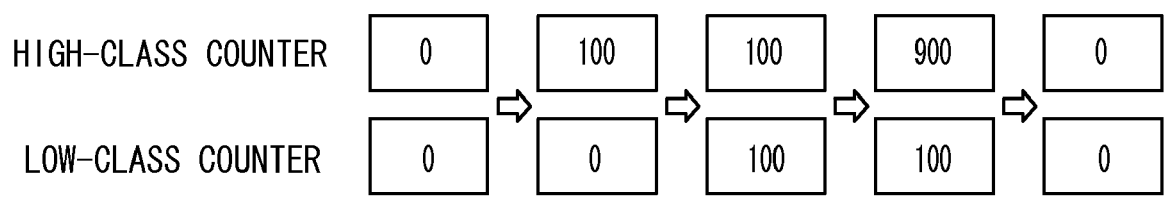
FIG. 8 is a diagram illustrating a method of clearing counters using packet output.

In particular, the count value of a counter for high-class packets and the count value of a counter for low-class packets are set to zero under the initial condition as shown in FIG. 8. If a packet of each class is output, the count is incremented by an amount corresponding to the amount of data of the packet. When the ratio of the count of one counter to the count of the other becomes equal to a weighting ratio (9:1 in FIG. 8) corresponding to the classes, the counts are cleared to 0. In this way, in WRR scheduling, the flow rate of packets of variable lengths actually output is counted. The flow rate is made coincident with the weighting ratio corresponding to the classes. Consequently, the output frequencies of packets can be weighted.

However, in a communication system where packets of variable lengths are exchanged, packets are various in size. Therefore, the total count obtained from the flow rate for each class is not always coincident with the weighting ratio. Accordingly, the counters that count the flow rates for individual classes need to be capable of counting up to very large values, because the total counts increase without agreeing with the weighting ratio.

Figure 9:
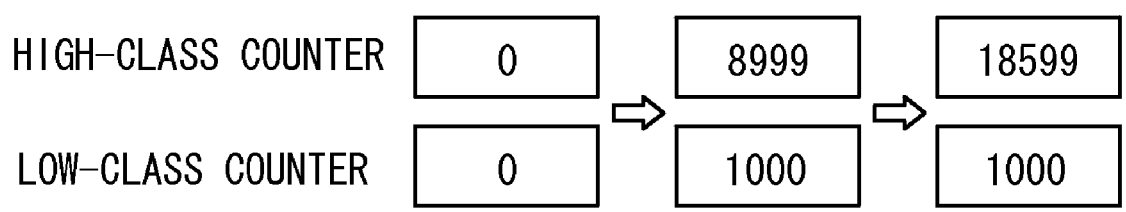
FIG. 9 is a diagram illustrating an example in which the counter values vary according to the packet output.

A specific example in which both counters are cleared when the ratio of the count of the counter for high-class packets to the count of the counter for low-class packets is 9:1 is now discussed. At this time, as shown in FIG. 9, if the count of the counter for high class is 8,999 bytes and the count of the counter for low class is 1,000 bytes, the ratio of the counts of the two counters becomes 9:1 and the counters will be cleared if another 1 byte of high-class packet is output. However, if a jumbo packet of 9,600 bytes, for example, is output from a high-class queue in an Ethernet™, the count of the counter for high class is 18,599 (=8,999+9,600) bytes as shown in FIG. 9. The ratio of the counts does not agree with 9:1. Hence, the counters are not cleared.

If a jumbo packet is output again when the ratio of the counts of the two counters subsequently approaches 9:1, the counters are not cleared in the same way as the foregoing. If this process repeats, the count values increase infinitely. Accordingly, such counters are impossible to realize. It is not practical to install such counters in a repeater.

It is also conceivable that certain error is tolerated for the ratio of the counts of the counters and the counters are cleared even if the ratio does not exactly agree with the weighting ratio. However, if this control is continued for a long time, errors are accumulated. Weighting according to classes is not performed accurately.

Embodiments of the present invention are hereinafter described in detail with reference to the drawings. In the following description, relaying of packets of variable lengths over an Ethernet™ network is taken as an example. The present invention can be applied to any communication device as long as variable-length packets for which quality classes or priority levels have been set are output.

FIG. 1 is a block diagram schematically showing the configuration of a repeater 100 associated with an exemplary Embodiment of the present invention. The repeater 100 shown in FIG. 1 has a switching portion 110, class-specific queue portions 120, and output control portions 130.

The switching portion 110 receives packets from terminals (not shown) or the like and outputs packets to the class-specific queue portions 120 corresponding to the destination addresses of the received packets.

The class-specific queue portions 120 have queues for different classes of packets, and hold the packets output from the switching portion 110 for individual classes.

Each output control portion 130 sends the packets held in the class-specific queue portions 120 to a network N, for example an Ethernet™ type network, at frequencies corresponding to their classes. At this time, the output control portion 130 counts the amounts of data of the packets output from the class-specific queue portions 120 for individual classes and makes the counted amounts of data approach ratios weighted according to the classes, thus controlling the output frequencies.

Figure 2:
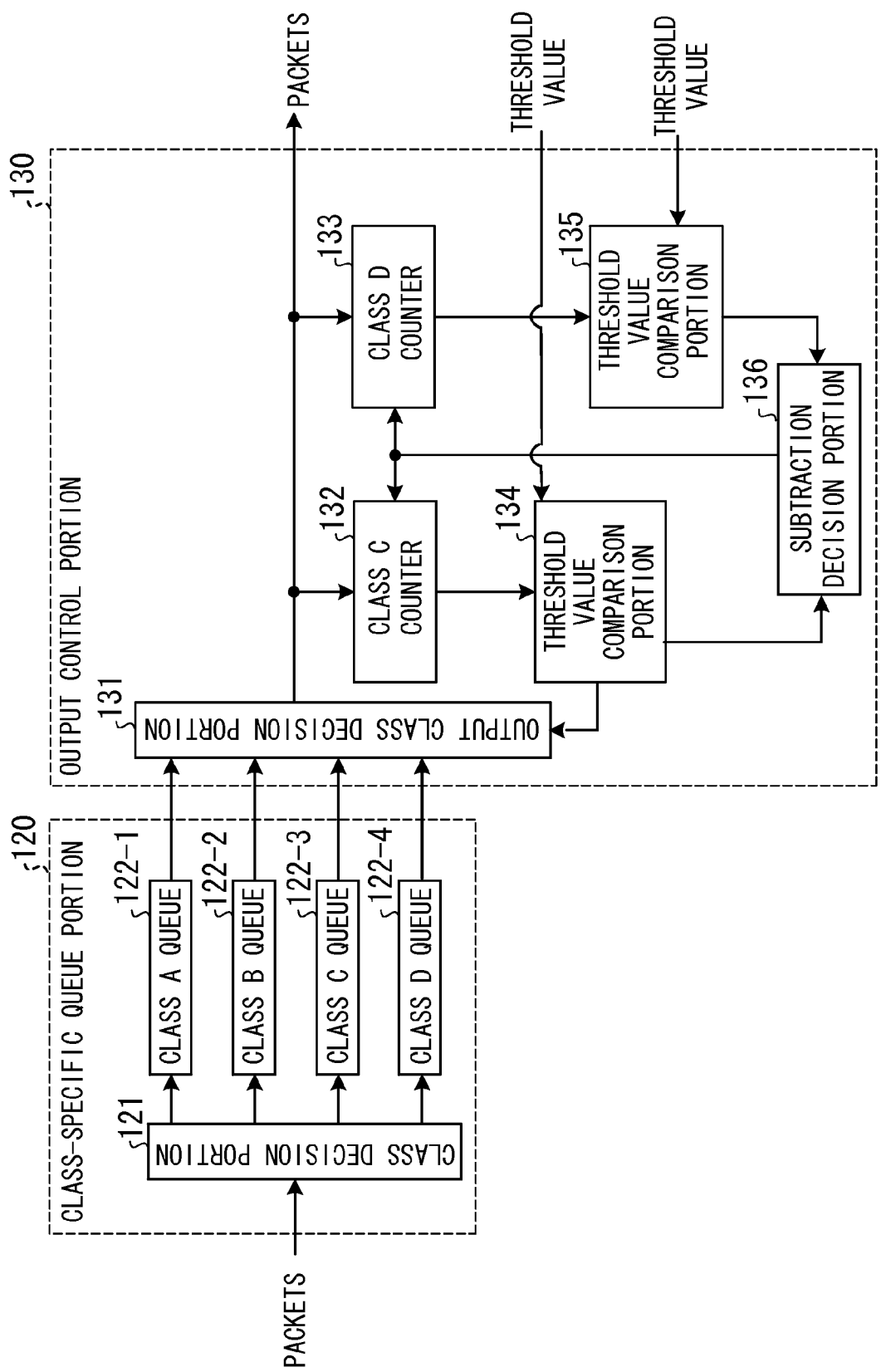
FIG. 2 is a block diagram showing the configurations of main portions of the repeater associated with the principles of the present invention.

FIG. 2 is a block diagram showing an example configuration of the main portions of the repeater associated with the present embodiment. In particular, FIG. 2 shows the internal structures of one of the class-specific queue portions 120 and one of the output control portions 130. The class-specific queue portion 120 shown in FIG. 2 has a class decision portion 121, a class A queue 122-1, a class B queue 122-2, a class C queue 122-3, and a class D queue 122-4. In this example among the classes A-D, the top priority is given to the class A. The lowest priority is given to the class D. With respect to packets of classes A and B, the priority is controlled by strict priority scheduling. On the other hand, with respect to packets of classes C and D, the priority is controlled by weighted round robin scheduling.

The class decision portion 121 references the header portion of each packet entered from the switching portion 110 and judges the class to which the packet belongs. The class decision portion 121 outputs packets to the queues 122-1 to 122-4 of the classes to which the packets belong.

The class A queue 122-1 temporarily holds packets of class A of the highest priority. The class B queue 122-2 temporarily holds packets of class B of the next highest priority. Because the priorities of packets of classes A and B are controlled by strict priority scheduling, packets are output from the class B queue 122-2 only when no packets are held in the class A queue 122-1.

The class C queue 122-3 temporarily holds packets of class C that is third highest in priority. The class D queue 122-4 temporarily holds packets of class D of the lowest priority. Because packets of classes C and D are controlled by WRR priority scheduling, packets held in the class C queue 122-3 and class D queue 122-4 are output at predetermined weighting ratios.

The output control portion 130 shown in FIG. 2 has an output class decision portion 131, a counter 132 for class C (hereinafter referred to as the class C counter), a counter 133 for class D (hereinafter referred to as the class D counter), a threshold value comparison portion 134, another threshold value comparison portion 135, and a subtraction decision portion 136.

The output class decision portion 131 determines the class of packets that are to be output, from what packets are held in the queues 122-1 to 122-4 and from the result of the comparison of threshold values made by the threshold value comparison portion 134. The decision portion 131 reads packets from the queues 122-1 to 122-4 of the determined class and outputs the packets. More specifically, where packets are held in the class A queue 122-1 or class B queue 122-2, the priority scheduling is the strict priority scheduling and so the output class decision portion 131 outputs packets of the highest priority. Where no packets are held in the class A queue 122-1 or class B queue 122-2, the priority scheduling is the weighted round robin scheduling and so the output class decision portion 131 outputs packets from the class C queue 122-3 and class D queue 122-4 at frequencies corresponding to the weighting ratios.

The class C counter 132 monitors the packets output from the output class decision portion 131 and counts the amount of data output in class C packets. That is, the count of the class C counter 132 is the value of accumulated data of packets (e.g., bytes) of class C output from the output control portion 130. The class C counter 132 subtracts a value indicated by the subtraction decision portion 136 from the count of the counter when the subtraction decision portion 136 gives an instruction for the subtraction.

The class D counter 133 monitors the packets output from the output class decision portion 131 and counts the amount of data output in class D packets. That is, the count of the class D counter 133 is the value of accumulated data of packets (e.g., bytes) of class D output from the output control portion 130. The class D counter 133 subtracts a value indicated by the subtraction decision portion 136 from the count when the subtraction decision portion 136 gives an instruction for the subtraction.

The threshold value comparison portion 134 has a preset threshold value for class C corresponding to the weighting ratios for classes C and D, and compares the count of the class C counter 132 with the preset threshold value. When the count of the class C counter 132 exceeds the threshold value, the threshold value comparison portion 134 informs the output class decision portion 131 and subtraction decision portion 136 that the threshold value is exceeded. At this time, the threshold value comparison portion 134 informs the subtraction decision portion 136 of the preset threshold value.

The threshold value comparison portion 135 has a preset threshold value for class D corresponding to the weighting ratios for classes C and D, and compares the count of the class D counter 133 with the preset threshold value. When the count of the class D counter 133 exceeds the threshold value, the threshold value comparison portion 135 informs the subtraction decision portion 136 of this fact. At this time, the threshold value comparison portion 135 informs the subtraction decision portion 136 of the preset threshold value.

The threshold values set into the threshold value comparison portions 134 and 135 correspond to the weighting ratios corresponding to the output frequencies of packets of classes C and D. That is, the ratio of the threshold value set into the threshold value comparison portion 134 to the threshold value set into the threshold value comparison portion 135 is coincident with the weighting ratio between classes C and D. Therefore, if the weighting ratio for the output frequencies for classes C and D is 9:1, for example, the ratio of the threshold value set into the threshold value comparison portion 134 to the threshold value set into the threshold value comparison portion 135 is 9:1 (e.g., 9,000 bytes to 1,000 bytes).

When the subtraction decision portion 136 is informed from the threshold value comparison portions 134 and 135 that the counts are in excess of their respective threshold values, the subtraction decision portion 136 instructs the class C counter 132 and class D counter 133 to subtract their threshold values from their respective counts. At this time, the subtraction decision portion 136 instructs the class C counter 132 to subtract the threshold value informed from the threshold value comparison portion 134. The decision portion 136 instructs the class D counter 133 to subtract the threshold value informed from the threshold value comparison portion 135.

Figure 3:
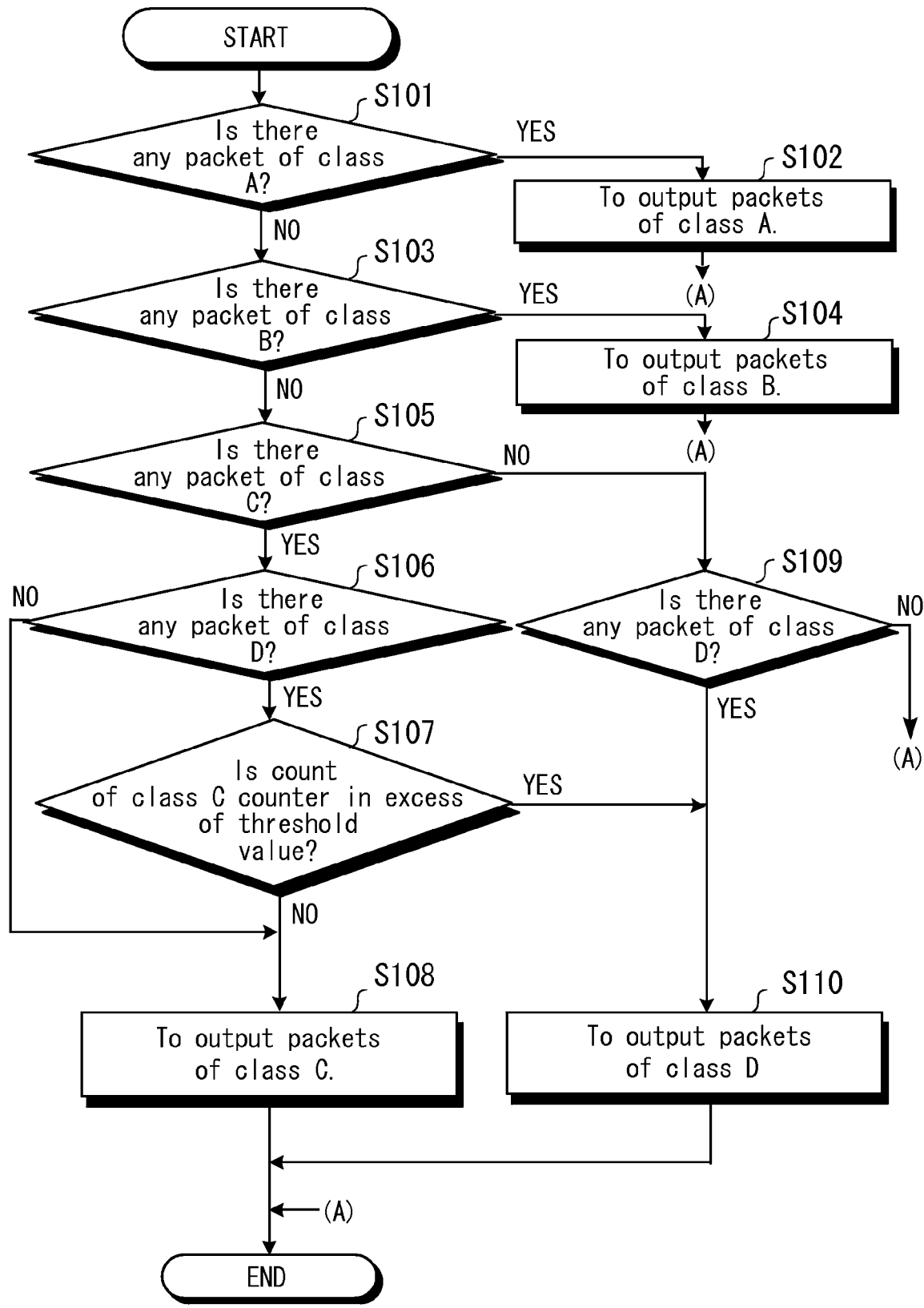
FIG. 3 is a flowchart illustrating a sequence of operations for determining the output classes, the operations being associated the principles of the invention.

The operation of the repeater 100 constructed according to the principles described above is next described by referring to the flowchart of FIG. 3, which illustrates an example operation of the output class decision portion 131.

When packets are output from the output control portion 130, the output class decision portion 131 first makes a decision as to whether packets are held in the class A queue 122-1 (step S101). If the decision at step S101 is Yes (packets are held in the class A queue 122-1), strict priority scheduling is applied to class A. Therefore, the packets held in the class A queue 122-1 are output (step S102).

If the decision at step S101 is No (i.e., no packets are held in the class A queue 122-1), the output class decision portion 131 makes a decision as to whether packets are held in the class B queue 122-2 (step S103). If packets are held in the class B queue 122-2 (Yes at step S103), strict priority scheduling is applied to class B. Consequently, the packets held in the class B queue 122-2 are output (step S104).

If no packets are held in the class B queue 122-2 (No at step S103), the output class decision portion 131 makes a decision as to whether packets are held in the class C queue 122-3 (step S105). If packets are held in the class C queue 122-3 (Yes at step S105), weighted round robin scheduling is applied to class C. Then, a decision is made as to whether packets are held in the class D queue 122-4 (step S106). If no packets are held in the class D queue 122-4 (No at step S106), it follows that packets are held only in the class C queue 122-3. The packets held in the class C queue 122-3 are output (step S108).

On the other hand, if packets are held in the class D queue 122-4 (Yes at step S106), a decision is made as to whether threshold value comparison portion 134 has informed that the count of the class C counter 132 is in excess of the threshold value (step S107). If the count is not in excess of the threshold value (No at step S107), packets held in the class C queue 122-3 with a higher degree of priority are output (step S108). If the count of the class C counter 132 is in excess of the threshold value (Yes at step S107), the decision is that sufficient priority is already given to class C. In this case, packets held in the class D queue 122-4 with a lower degree of priority are output (step S110). The processing described so far is repeated every time or at given intervals.

In this way, in the present embodiment, if packets are held in both class C queue 122-3 and class D queue 122-4, packets of class C are output by the output class decision portion 131 until the amount of data of the output packets belonging to class C reaches the threshold value set into the threshold value comparison portion 134. When the amount of data of the output packets belonging to class C reaches the threshold value set into the threshold value comparison portion 134, packets of class D are then output by the output class decision portion 131.

Accordingly, with respect to packets of classes C and D to which weighted round robin scheduling is applied, it is unlikely that only packets of class C are invariably output. After packets of class C are output until a given amount of data is reached, packets of class D are output. In the present embodiment, if packets of class D are output until a given amount of data is reached, the counts of the class C counter 132 and class D counter 133 are reduced by subtraction. Therefore, the count of the class C counter 132 becomes less than the threshold value again. The output class decision portion 131 begins to output packets of class C. The processing described so far will be described in detail later.

If no packets are held in the class C queue 122-3 (No at step S105), and if packets are held in the class D queue 122-4 (Yes at step S109), it follows that packets are held only in the class D queue 122-4. Consequently, packets held in the class D queue 122-4 are output (step S110).

Figure 4:
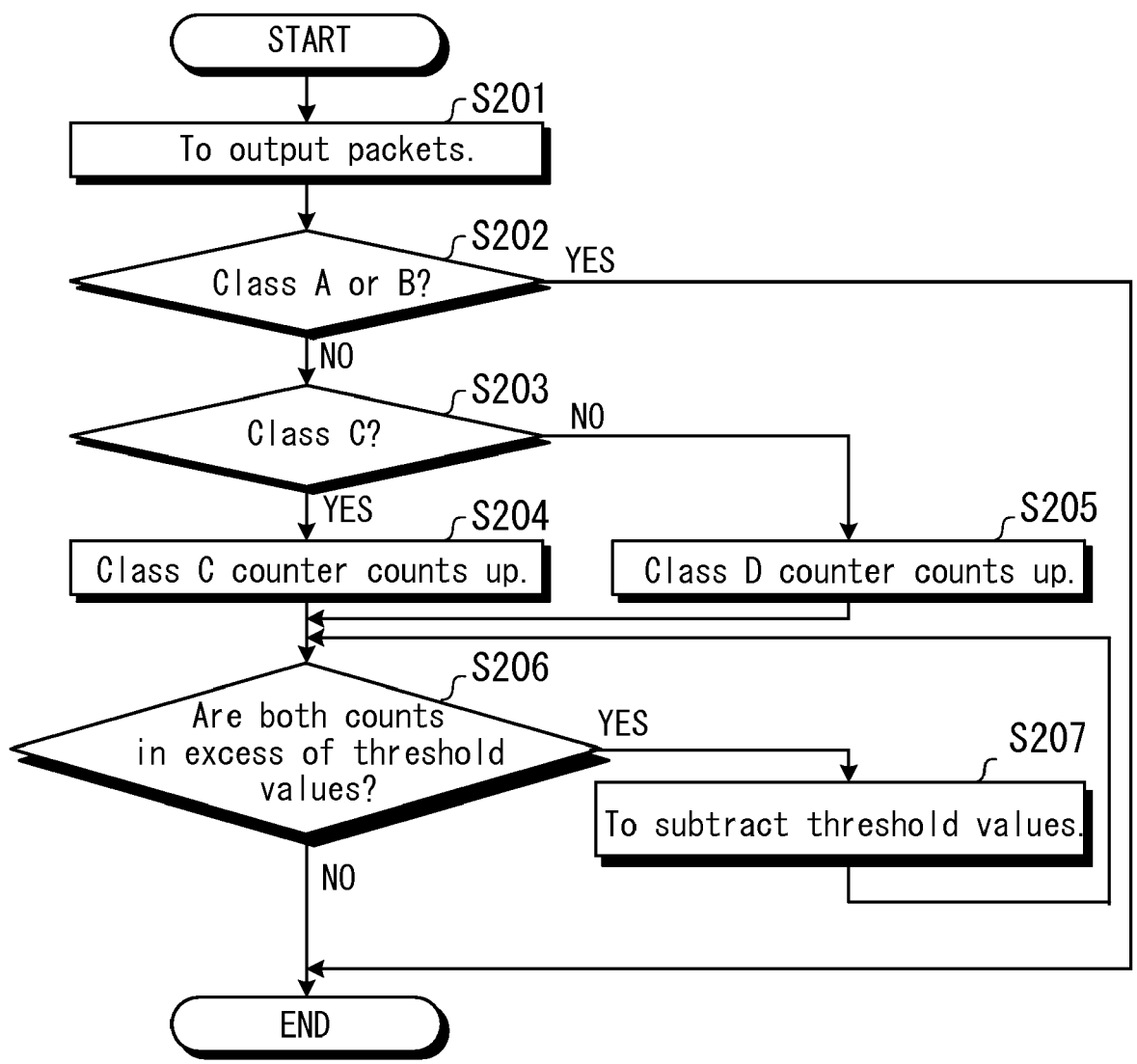
FIG. 4 is a flowchart illustrating a sequence of operations for adjusting counters, the operations being associated with the principles of the invention.

The operation of the counters for adjusting them is next described by referring to the flowchart of FIG. 4, the operation being associated with the principles of the present embodiment.

If the output class decision portion 131 outputs packets as mentioned previously (step S201), the class C counter 132 and class D counter 133 monitor the classes of the output packets. In particular, the class C counter 132 and class D counter 133 make decisions as to whether the classes of output packets are class A or B (step S202). If each output packet belongs to none of the classes A and B (No in step S202), a decision is made as to whether packets of class C have been output (step S203).

If packets of class C have been output (Yes at step S203), the class C counter 132 counts an amount corresponding to the amount of data of the output packets (step S204). If packets of class D are output (No at step S203), the class D counter 133 counts an amount corresponding to the amount of data of the output packets (step S205).

The total counts obtained by counting the amount of data of output packets belonging to classes C and D in this way are compared with the threshold values by the threshold value comparison portions 134 and 135. When the total counts exceed their respective threshold values, the subtraction decision portion 136 is informed of the threshold values, as well as the fact that the threshold values have been exceeded. The subtraction decision portion 136 makes a decision as to whether both of the threshold value comparison portions 134 and 135 have informed that their count values have exceeded the threshold values (step S206).

As a result, if both of the threshold value comparison portions 134 and 135 have informed that the total counts have exceeded the threshold values, the subtraction decision portion 136 instructs the class C counter 132 and class D counter 133 to subtract their threshold values from their respective total counts. That is, the subtraction decision portion 136 instructs the class C counter 132 to subtract the threshold value set into the threshold value comparison portion 134 from the count. The decision portion instructs the class D counter 133 to subtract the threshold value set into the threshold value comparison portion 135 from the count. In response to the instructions, the class C counter 132 and class D counter 133 subtract the threshold values corresponding to their classes from their respective counts (step S207).

The total counts obtained after subtraction of the threshold values are again compared with their respective threshold values by the threshold value comparison portions 134 and 135. The subtraction decision portion 136 makes a decision as to whether both threshold value comparison portions 134 and 135 have informed that the counts have exceeded their respective threshold values (step S206). The threshold values are subtracted from the counts of the two counters until at least one of the counts of the class C counter 132 and class D counter 133 has become below the threshold value.

An instruction for subtracting a threshold value from the count of a counter is issued from the subtraction decision portion 136 when the counts of the class C counter 132 and class D counter 133 have exceeded their respective threshold values. Therefore, after the subtraction of the threshold values, the counts of the counters are always in excess of 0. It is unlikely that a threshold value cannot be subtracted, irrespective of the value of the count. Even if the count of the class C counter 132 is in excess of the threshold value, and if the output class decision portion 131 has continued to output packets of class D, the count of the class C counter 132 eventually becomes below the threshold value by subtracting the threshold value from the count. The output class decision portion 131 again starts to output packets of class C.

Because the ratio of the threshold values compared with the counts of the counters by the threshold value comparison portions 134 and 135 is coincident with the weighting ratio between classes C and D, the count obtained after subtraction of the threshold value is none other than the amount of data corresponding to an amount of error not coincident with the weighting ratio, the amount of error being contained in the amount of data of already output packets of classes C and D.

After subtraction of the threshold values from the respective counts, the amount of data of output packets belonging to classes C and D are counted in an additive manner to the amount of data corresponding to the error. When the counts of the class C counter 132 and class D counter 133 have exceeded their respective threshold values, the threshold values are again subtracted from the counts. Therefore, those portions of the amount of data of output packets which are coincident with the weighting ratios for classes C and D are successively subtracted from the counts. In the long term, the weighting ratios set for classes C and D are obeyed.

Furthermore, when the counts of the class C counter 132 and class D counter 133 have exceeded their respective threshold values, the threshold values are subtracted from the counts. Therefore, the counts are prevented from keeping on increasing. That is, it is easy to output packets according to the weighting ratios for classes C and D.

Figure 5:
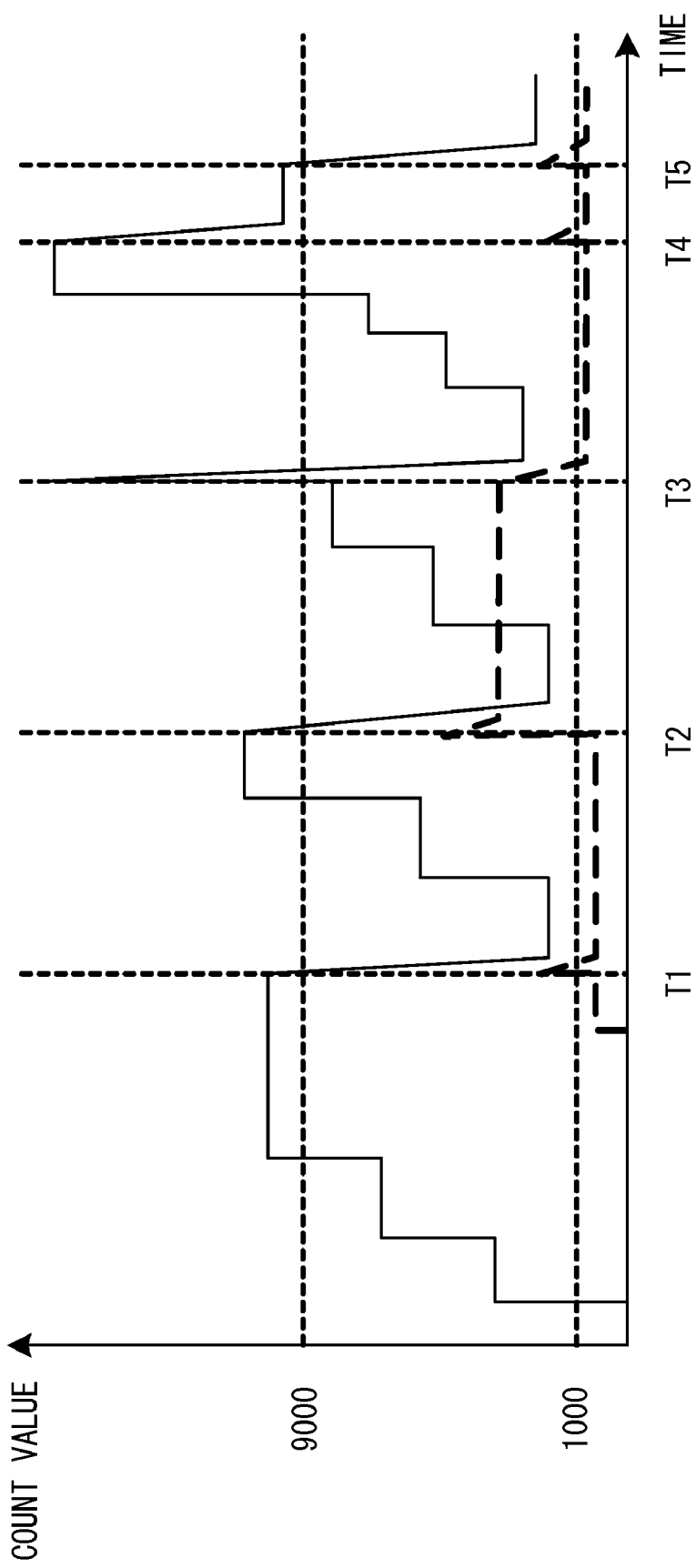
FIG. 5 is a graph showing a specific example of adjustment of the counters, the operations being associated with the principles of the invention.

A specific example of counter adjustment associated with the principles of the present embodiment is next described by referring to FIG. 5, in which time sequential variations of the counts of the class C counter 132 and class D counter 133 are shown. In FIG. 5, the solid line indicates the count of the class C counter 132. The broken line indicates the count of the class D counter 133. It is assumed that the weighting ratios for classes C and D are 9:1 and that the threshold values set into the threshold value comparison portions 134 and 135 are 9,000 bytes and 1,000 bytes, respectively.

In the present embodiment, packets of classes C and D are output by the output class decision portion 131 only when packets of classes A and B are not held in the class A queue 122-1 and class B queue 122-2. With respect to packets of classes C and D, packets of class C are output until the count of the class C counter 132 reaches the threshold value (9,000 bytes) set into the threshold value comparison portion 134.

Accordingly, in FIG. 5, after the count (indicated by the solid line) of the class C counter 132 has reached 9,000 bytes or higher, priority is given to class D over class C. Packets of class D are started to be output from the output class decision portion 131. In the following description, it is assumed for simplicity of illustration that packets of classes A and B are not held in class A queue 122-1 and class B queue 122-2.

When the count of the class D counter 133 becomes greater than the threshold value of 1,000 bytes at instant T1 after packets of class D were started to be output, results of comparisons made by the threshold value comparison portions 134 and 135 indicate that the counts of the counters are in excess of the threshold values. Therefore, the subtraction decision portion 136 instructs the class C counter 132 and class D counter 133 to perform subtraction. On receiving the instruction, in the class C counter 132, the threshold value of 9,000 bytes set into the threshold value comparison portion 134 is subtracted from the count. In the class D counter 133, the threshold value of 1,000 bytes set into the threshold value comparison portion 135 is subtracted from the count.

Immediately after the instant T1, the count of the class C counter 132 becomes less than the threshold value. Therefore, based on the result of comparison made by the threshold value comparison portion 134, priority is given to class C over class D. Packets of class C are started to be output from the output class decision portion 131. Subsequently, packets of class C are output until the count of the class C counter 132 reaches the threshold value of 9,000 bytes. After the count of the class C counter 132 has reached the threshold value of 9,000 bytes, packets of class D begin to be output.

If the count of the class D counter 133 is higher than the threshold value of 1,000 bytes at instant T2, results of comparisons made by both threshold value comparison portions 134 and 135 indicate that their counts are in excess of their respective threshold values. Therefore, the subtraction decision portion 136 gives an instruction for subtraction to the class C counter 132 and class D counter 133. On receiving the instruction, in the class C counter 132, the threshold value of 9,000 set into the threshold value comparison portion 134 is subtracted from the count. In the class D counter 133, the threshold value of 1,000 set into the threshold value comparison portion 135 is subtracted from the count.

Consequently, immediately after the instant T2, the count of the class C counter 132 becomes less than the threshold value. Therefore, based on the result of the comparison made by the threshold value comparison portion 134, priority is given to class C over class D. Packets of class C begin to be output from the output class decision portion 131. On the other hand, immediately after the instant T2, the count of the class D counter 133 is not less than the threshold value. However, the result of the comparison made only by the threshold value comparison portion 135 indicates that the count is in excess of the threshold value because the class C counter is below the threshold. In consequence, it is unlikely that another instruction for subtraction is issued from the subtraction decision portion 136.

If the count of the class C counter 132 becomes greater than the threshold value of 9,000 bytes at instant T3, the results of comparisons made by the threshold value comparison portions 134 and 135 indicate that the counts are in excess of the threshold values. Therefore, the subtraction decision portion 136 issues an instruction for subtraction to the class C counter 132 and class D counter 133. On receiving the instruction, in the class C counter 132, the threshold value of 9,000 bytes set into the threshold value comparison portion 134 is subtracted from the count. In the class D counter 133, the threshold value of 1,000 bytes set into the threshold value comparison portion 135 is subtracted from the count.

Consequently, immediately after the instant T3, the threshold values are subtracted from the counts of the class C counter 132 and class D counter 133. If a threshold value is subtracted once from each counter's count and the counts are still higher than the threshold values, the subtraction decision portion 136 again issues an instruction for subtraction. Accordingly, immediately after the instant T3, the threshold values are subtracted twice respectively from the counts of the class C counter 132 and class D counter 133. After the subtractions, the count of the class C counter 132 is less than the threshold value. Therefore, based on the result of the comparison made by the threshold value comparison portion 134, priority is given to class C over class D. Packets of class C begin to be output from the output class decision portion 131. Subsequently, packets of class C are output until the count of the class C counter 132 reaches the threshold value of 9,000 bytes. After the count of the class C counter 132 has reached the threshold value of 9,000 bytes, packets of class D start to be output.

If the count of the class D counter 133 becomes higher than the threshold value of 1,000 bytes at instant T4, the results of comparisons made by the threshold value comparison portions 134 and 135 indicate that the counts are in excess of the threshold values. Therefore, the subtraction decision portion 136 issues an instruction for subtraction to the class C counter 132 and class D counter 133. On receiving the instruction, in the class C counter 132, the threshold value of 9,000 bytes set into the threshold value comparison portion 134 is subtracted from the count. In the class D counter 133, the threshold value of 1,000 bytes set into the threshold value comparison portion 135 is subtracted from the count.

Consequently, immediately after the instant T4, the threshold values are subtracted from the counts of the class C counter 132 and class D counter 133. However, the count of the class C counter 132 does not become less than the threshold value. Only the count of the class D counter 133 becomes less than the threshold value. Also, in this case, only the result of the comparison made by the threshold value comparison portion 134 indicates that the counter's count is in excess of the threshold value because the class D counter 133 is below the threshold. Therefore, another instruction for subtraction is not issued from the subtraction decision portion 136. Because the count of the class C counter 132 is in excess of the threshold value, packets of class D are output after the subtraction.

At instant T5, if the count of the class D counter 133 becomes higher than the threshold value of 1,000 bytes, the results of the comparisons made by the threshold value comparison portions 134 and 135 indicate that the counts are in excess of the threshold values. Therefore, the subtraction decision portion 136 issues an instruction for subtraction to the class C counter 132 and class D counter 133. On receiving the instruction, in the class C counter 132, the threshold value of 9,000 set into the threshold value comparison portion 134 is subtracted from the count. In the class D counter 133, the threshold value of 1,000 set into the threshold value comparison portion 135 is subtracted from the count.

As described so far, according to the present embodiment, with respect to packets of classes controlled in terms of priority by weighted round robin scheduling, the amount of data of actually output packets are counted for each class. When the counts of the counters obtained for all the classes become greater than threshold values of ratios coincident with the weighting ratios for the classes, threshold values for the classes are subtracted from the counts for the classes. Therefore, those portions of the amount of data of output packets which are coincident in weighting ratio for each class are successively subtracted from the counts of the counters. Weighting ratios for output frequencies corresponding to classes can be obeyed. Furthermore, it is unlikely that each counter's count keeps on increasing. It is easy to accomplish this configuration.

In another Embodiment of the present invention the lengths of output packets are observed and a threshold value against which a count value indicating the amount of data of the output packets is compared is set based on the observed packet lengths.

The configuration of the repeater associated with the present embodiment is roughly identical with the configuration of the repeater 100 (FIG. 1) and so its description is omitted.

Figure 6:
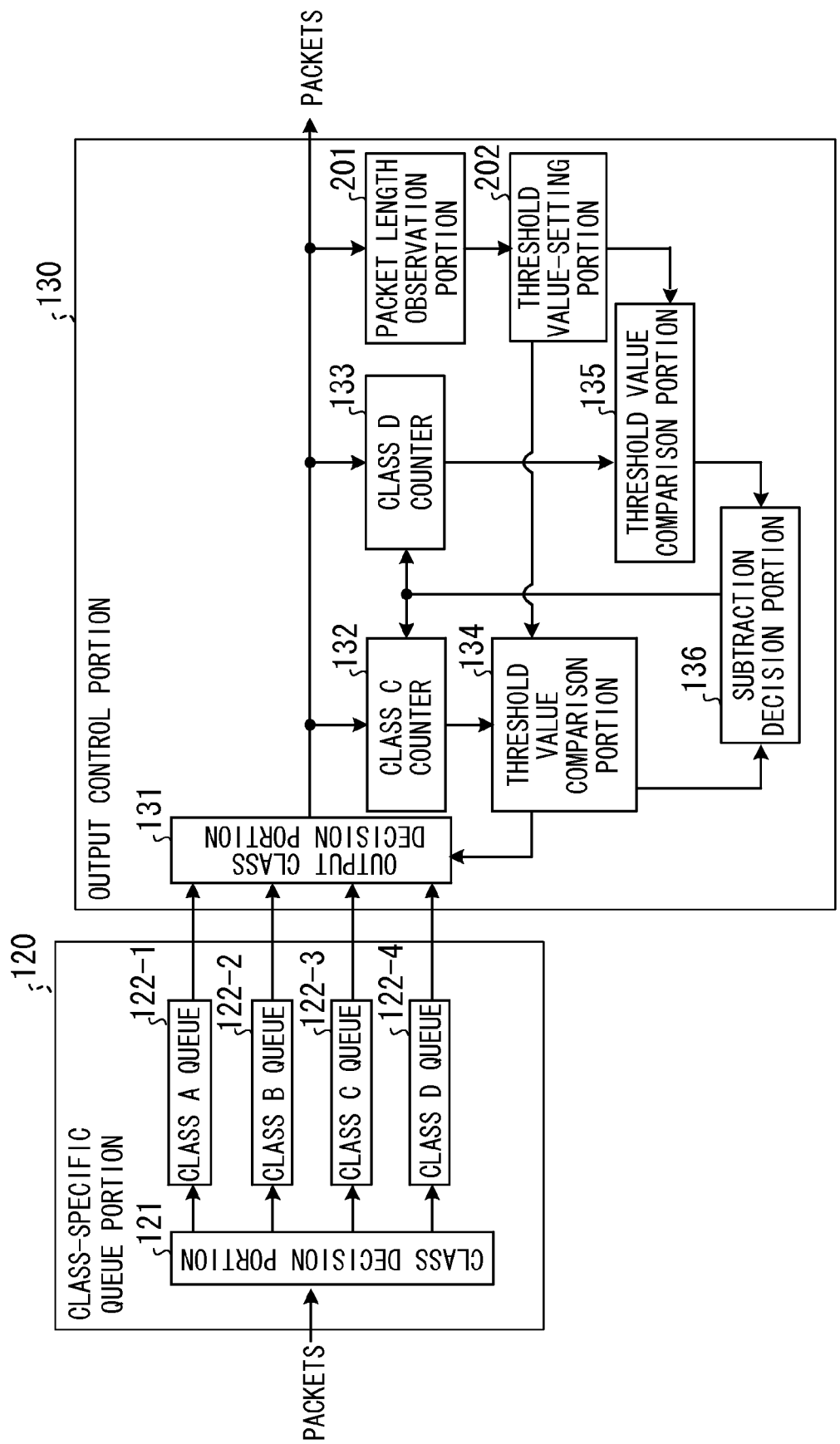
FIG. 6 is a block diagram showing the configurations of main portions of a repeater associated with another exemplary Embodiment of the invention.

FIG. 6 is a block diagram showing the structures of main portions of the repeater associated with the present embodiment. In particular, FIG. 6 shows the internal structure of a class-specific queue portion 120 and an output control portion 130. In FIGS. 2 and 6, like components are indicated by like reference numerals. Those components which have been already described in connection with FIG. 2 will not be described below. In FIG. 6, a packet length observation portion 201 and a threshold value-setting portion 202 are added to the output control portion 130 of FIG. 2.

The packet length observation portion 201 observes the length of each packet output from the output class decision portion 131 when the repeater is activated. Specifically, the packet length observation portion 201 observes the length of each packet (i.e., senses how many bytes the packet has) of class C or D output from the output class decision portion 131 when the repeater is activated, and informs the threshold value-setting portion 202 of the observed packet length.

The threshold value-setting portion 202 calculates the average value of packet lengths when the number of packets whose packet lengths have been observed by the packet length observation portion 201 reaches a given number, and multiplies the obtained average packet length by weight coefficients for classes C and D to determine threshold values. The threshold value-setting portion 202 sets threshold values into the threshold value comparison portions 134 and 135. The counts of counters for packets of classes C and D are compared against the set threshold values. The weight coefficients by which the average packet length is multiplied are ratio coefficients coincident with weighting ratios for classes C and D. That is, where the weighting ratios for classes C and D are 9:1, for example, the weight coefficient for class C and the weight coefficient for class D provide a ratio of 9:1. Therefore, when the average packet length is 1,000 bytes, for example, the threshold value set into the threshold value comparison portion 134 is 9,000 (=1,000×9) if it is assumed that the weight coefficients for classes C and D are 9 and 1, respectively. The threshold value set into the threshold value comparison portion 135 is 1,000 (=1,000×1).

Figure 7:
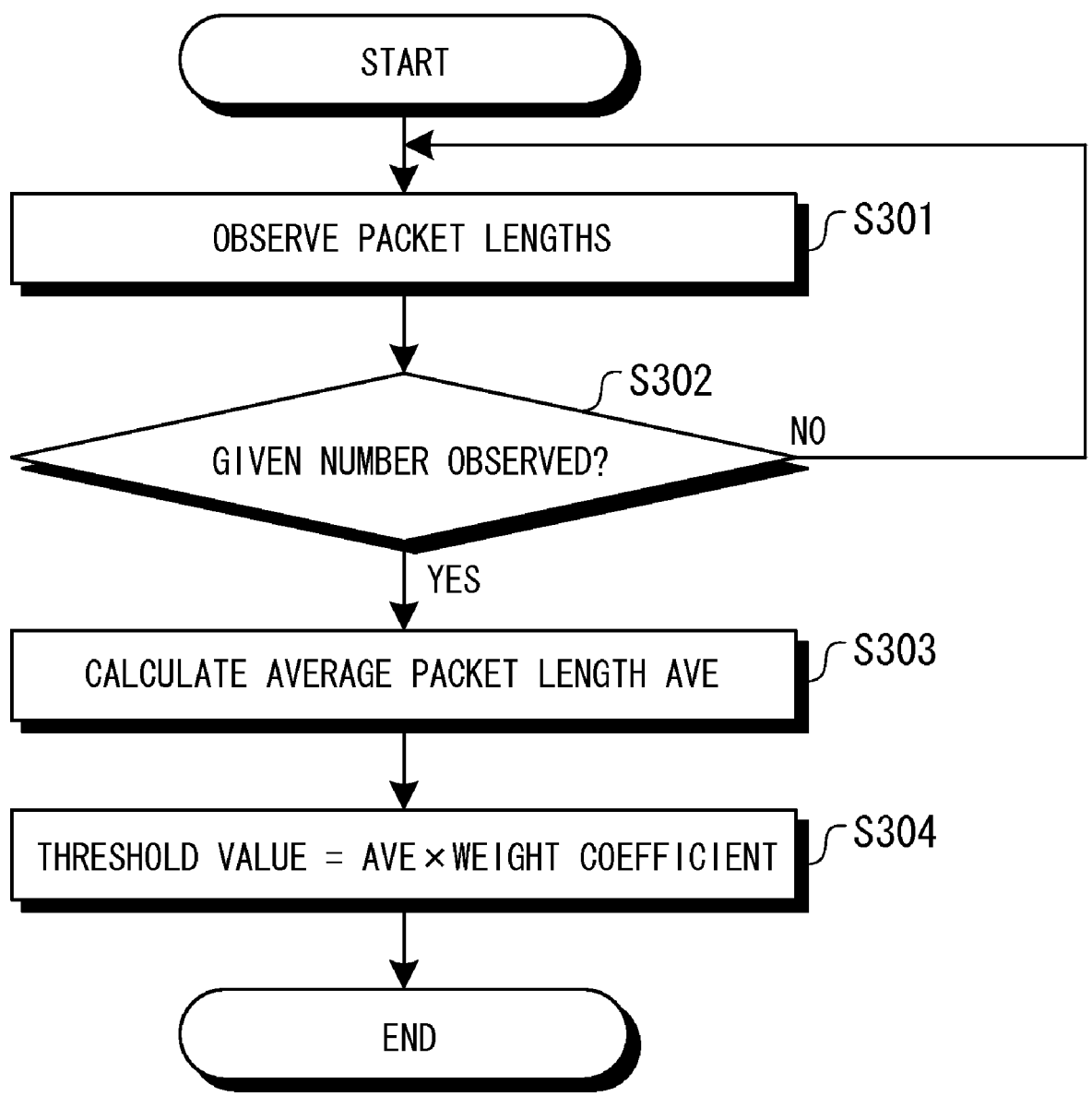
FIG. 7 is a flowchart illustrating a sequence of operations for setting threshold values, the operations being associated with the principles of the invention.

An example sequence of operations of the output control portion 130 constructed as described above to set the threshold value is described by referring to the flowchart of FIG. 7.

First, when the repeater associated with the principles of the present embodiment is activated, the output class decision portion 131 determines the class of packets to be output similarly as in the above Embodiment. Packets held in queues 122-1 to 122-4 are output. At this time, no threshold value is set into the threshold value comparison portion 134. Where packets are held only in the class C queue 122-3 and class D queue 122-4 at this time, packets of class C are output by temporarily utilizing strict priority scheduling, for example. Alternatively, the output frequencies of packets of classes C and D may be controlled such that the number of output packets is coincident with the weighting ratios for classes C and D irrespective of packet length.

When packets are output from the output class decision portion 131, the packet length observation portion 201 observes the length of each output packet (step S301). At this time, it is necessary to set threshold values only regarding classes C and D, the counts of the counters being compared against the threshold values. Therefore, only when packets of classes C and D are output, packet lengths are observed. The observed packet lengths are output to the threshold value-setting portion 202, where the lengths are held.

The threshold value-setting portion 202 makes a decision as to whether or not a given number of packets whose packet lengths are observed by the packet length observation portion 201 have been output (step S302). If the number of packets has not reached the given number (No at step S302), the packet length observation portion 201 continues to observe packet lengths.

When the number of packets has reached the given number (Yes at step S302), the threshold value-setting portion 202 calculates the average value of the held packet lengths to obtain an average packet length "Ave" (step S303). In calculating the average value of packet lengths at this time, abnormal values lying in the upper 5% range and in the lower 5% range, for example, may be excluded. Thus, normal sizes of packets of classes C and D are found. The threshold value-setting portion 202 multiplies the average packet length "Ave" by the weight coefficients for classes C and D to calculate threshold values (step S304). That is, if the weight coefficients for classes C and D are 9 and 1, respectively, which are equal to the weighting ratios, for example, the threshold value for class C has a value that is 9 times as great as the average packet length "Ave." The threshold value for class D has a value that is 1 times as large as the average packet length "Ave."

The threshold values calculated in this way are set into the threshold value comparison portions 134 and 135 by the threshold value-setting portion 202. That is, the threshold value for class C is set into the threshold value comparison portion 134. The threshold value for class D is set into the threshold value comparison portion 135. After setting the threshold values, the output class is determined similarly as in the above Embodiment. The count values of the class C counter 132 and class D counter 133 are adjusted.

In the present embodiment, the repeater which outputs packets of variable lengths by previously observing packet lengths and determining threshold values can set the threshold values according to actual circumstances. Accordingly, the processing load can be alleviated by making appropriate the number of instructions for subtraction issued from the subtraction decision portion 136 to the class C counter 132 and class D counter 133.

As described so far, according to the present embodiment, packet lengths are observed during activation of the repeater. Threshold values are determined based on the observed packet lengths. The counts of the counters are compared against the threshold values. Thus, the output class is determined, and subtraction from the counts of the counters is performed. Therefore, in a communication system where packets of various packet lengths are exchanged, the threshold values can be determined according to actual circumstances. The processing load can be reduced by appropriately adjusting the number of instructions issued to the counters to make subtractions.

In the above embodiments, threshold values for different classes are subtracted from the counts of the class C counter 132 and class D counter 133 in response to instructions for subtraction, the instructions being issued from the subtraction decision portion 136. Values subtracted from the counts of counters are not always threshold values. That is, values of ratios coincident with weighting ratios used in multi-class priority control may be subtracted from the respective counts of the counters. For example, where the threshold value for the count of the class C counter 132 is 9,000 bytes and the threshold value for the count of the class D counter 133 is 1,000 bytes, values of 900 bytes and 100 bytes may be subtracted from the counts of the counters.

In the above example embodiments, 4 classes (i.e., classes A to D) are assumed. Strict priority scheduling is applied to the upper two classes (classes A and B). Weighted round robin scheduling is applied to the lower two classes (classes C and D). However, the total number of classes may be set to an arbitrary number. Furthermore, the number of classes to which one priority scheme is applied may be set to an arbitrary number.

In an embodiment of the present invention, some or all of the method components are implemented as a computer executable code. Such a computer executable code contains a plurality of computer instructions that when performed in a predefined order result with the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more central processing units ("CPU"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing appropriate software. When provided by a processor, the functions may be provided by a single dedicated processor, by a single shared processor, or by a plurality of individual processors, some of which may be shared. Explicit use of the term "processor" or "controller" should not be construed to refer exclusively to hardware capable of executing software, and may implicitly include, without limitation, digital signal processor hardware, ROM, RAM, and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A communication device comprising:
    first and second holding circuitries, equipped corresponding to a first and second quality classes respectively, operable to hold packets each of which has a variable length and a quality class;
    first and second counters, equipped corresponding to a first and second quality classes respectively, operable to count an amount of data of packets, belonging to the first and second quality classes respectively, output from an output circuitry;
    first and second comparison circuitries, equipped corresponding to the first and the second quality classes respectively, operable to compare a count value of the respective counters with a first and second threshold values respectively;
    the output circuitry operable to output packets held in one of the first and second holding circuitries based on results of the comparisons made by the first and second comparison circuitries; and
    a subtraction decision circuitry which, when the results of the comparisons indicate that the count values are in excess of the respective threshold values, subtracts value corresponding to the first threshold value from the count value of the first counter and subtracts value corresponding to the second threshold value from the count value of the second counter;
    wherein a ratio of the first and second threshold values is set to correspond to a weighting ratio corresponding to the output frequencies of packets of the first and the second quality classes;
    the communication device further comprising:
    an observation circuitry operable to observe packet lengths of packets output by the output portion; and
    a threshold setting circuitry operable to set threshold values based on the packet lengths observed by the observation portion.

2. The communication device according to claim 1, wherein when a result of comparison made by the first comparison circuitry indicates that a count value of the first counter is in excess of the first threshold value, the output portion outputs packets of the second quality class that is lower than the first quality class.

3. The communication device according to claim 1, wherein the threshold setting circuitry finds the threshold values by multiplying an average value of the packet lengths observed by the observation circuitry by weight coefficients for the quality classes, the weight coefficients corresponding to the weighting ratios.

4. The communication device according to claim 1, wherein the first and second holding circuitries temporarily holds packets for each quality class set to the packets.

5. The communication device according to claim 1, wherein the subtraction occurs only when the comparison circuitries indicate that the count values for all the compared quality classes are in excess of the respective threshold values.

6. The communication device according to claim 5, wherein a portion of all the quality classes are priority classes controlled by weighted round robin scheduling.

7. A communication device comprising:
    first and second holding circuitries, equipped corresponding to a first and second quality classes respectively, operable to hold packets each of which has a variable length and a quality class;
    first and second counters, equipped corresponding to a first and second quality classes respectively, operable to count an amount of data of packets, belonging to the first and second quality classes respectively, output from an output circuitry;
    first and second comparison circuitries, equipped corresponding to the first and the second quality classes respectively, operable to compare a count value of the respective counters with a first and second threshold values respectively;

the output circuitry operable to output packets held in one of the first and second holding circuitries based on results of the comparisons made by the first and second comparison circuitries; and a subtraction decision circuitry which, when the results of the comparisons indicate that the count values are in excess of the respective threshold values, subtracts value corresponding to the first threshold value from the count value of the first counter and subtracts value corresponding to the second threshold value from the count value of the second counter;

wherein a ratio of the first and second threshold values is set to correspond to a weighting ratio corresponding to the output frequencies of packets of the first and the second quality classes, and wherein the subtraction decision circuitry subtracts the threshold values themselves for the quality classes from count values of the counters.

8. A communication device operable to output packets each of which has a variable length and a quality class, said communication device comprising:

a holding circuitry operable to temporarily hold packets;

a counter operable to count an amount of data of packets output from the holding circuitry for each individual quality class;

a comparison circuitry operable to compare count values of the counter for individual quality classes with threshold values which are threshold values for the quality classes, respectively, a ratio of the threshold values for the quality classes being coincident with a weighting ratio between the quality classes, wherein said comparison circuitry includes:

an observation circuitry operable to observe packet lengths of packets output by the output portion, and a threshold setting circuitry operable to set threshold values for the individual quality classes based on the packet lengths observed by the observation circuitry;

an output circuitry operable to output packets held in the holding circuitry based on results of comparisons made by the comparison portion; and a control circuitry which, when the results of the comparisons made by the comparison circuitry indicate that the count values for the quality classes are in excess of the respective threshold values, subtracts values corresponding to the threshold values for the quality classes from the count values of the counter for the individual quality classes wherein said threshold setting circuitry finds the threshold values for the individual quality classes by multiplying an average value of the packet lengths observed by the observation circuitry by weight coefficients for the individual quality classes, the weight coefficients corresponding to the weighting ratios.

9. The apparatus according to claim 8, wherein the comparison circuitry compares only a portion of all the quality classes with their respective threshold values and the subtraction occurs only when the comparator indicates that the count values for all the compared quality classes are in excess of the respective threshold values.

* * * * *